US008919807B2

(12) United States Patent
Taylor et al.

(10) Patent No.: US 8,919,807 B2
(45) Date of Patent: Dec. 30, 2014

(54) INFANT STROLLER APPARATUS AND APPARATUS FOR SEATING A CHILD

(71) Applicant: Wonderland Nurserygoods Company Limited, Central Hong Kong (HK)

(72) Inventors: Andrew J. Taylor, Mohnton, PA (US); Curtis M. Hartenstine, Birdsboro, PA (US); Robert E. Haut, West Chester, PA (US); Dylan A. Mellinger, Narvon, PA (US)

(73) Assignee: Wonderland Nurserygoods Company Limited (HK)

( * ) Notice: Subject to any disclaimer, the term of this patent is extended or adjusted under 35 U.S.C. 154(b) by 72 days.

(21) Appl. No.: 13/855,864

(22) Filed: Apr. 3, 2013

(65) Prior Publication Data

US 2013/0264799 A1 Oct. 10, 2013

Related U.S. Application Data

(60) Provisional application No. 61/686,450, filed on Apr. 5, 2012.

(51) Int. Cl.
*B62B 7/06* (2006.01)

(52) U.S. Cl.
CPC ........................ *B62B 7/06* (2013.01)
USPC .......................... 280/647; 280/642

(58) Field of Classification Search
CPC ................................ B52B 7/064; B52B 7/066
USPC .................................. 280/642, 647
See application file for complete search history.

(56) References Cited

U.S. PATENT DOCUMENTS

| | | | | |
|---|---|---|---|---|
| 4,848,787 A * | 7/1989 | Kassai | ........................ | 280/642 |
| 5,645,293 A * | 7/1997 | Cheng | ........................ | 280/642 |
| 5,709,400 A | 1/1998 | Bonnier et al. | | |
| 5,938,230 A | 8/1999 | Huang et al. | | |
| 6,062,587 A * | 5/2000 | Cabagnero | ................... | 280/642 |
| 6,120,054 A * | 9/2000 | Hu | ................ | 280/650 |
| 6,276,709 B1 * | 8/2001 | Chen et al. | .................. | 280/650 |
| 6,375,213 B1 * | 4/2002 | Suzuki | ........................ | 280/649 |
| 6,478,327 B1 * | 11/2002 | Hartenstine et al. | .......... | 280/642 |
| 6,692,015 B2 * | 2/2004 | Perego | ........................ | 280/647 |
| 7,523,954 B2 * | 4/2009 | Dotsey et al. | ................. | 280/642 |
| 8,056,921 B2 * | 11/2011 | Dotsey et al. | ................. | 280/647 |
| 8,210,563 B2 * | 7/2012 | Dotsey et al. | ................. | 280/647 |
| 2006/0255566 A1 | 11/2006 | Dotsey et al. | | |

(Continued)

FOREIGN PATENT DOCUMENTS

EP 1190931 A2 3/2002

*Primary Examiner* — Jeffrey J Restifo

(74) *Attorney, Agent, or Firm* — David I. Roche; Baker & McKenzie LLP (57) ABSTRACT

An infant stroller apparatus includes a rear leg frame including a first side segment, a handle having a second side segment formed by at least a first and a second tubular member telescopically assembled with each other, an impeding part assembled with the second side segment and operable to create an interference that blocks retraction of the second tubular member into the first tubular member, and an armrest pivotally connected with the second side segment and provided with an actuating member disposed adjacent to the impeding part. A rotation of the armrest in a direction for collapsing the infant stroller apparatus can cause a displacement of the actuating member, which drives the impeding part in movement to remove the interference and allow retraction of the second tubular member into the first tubular member.

22 Claims, 6 Drawing Sheets

(56) References Cited

U.S. PATENT DOCUMENTS

2010/0133789 A1* 6/2010 Tanizaki et al. .............. 280/642
2013/0264798 A1* 10/2013 Haut et al. .................... 280/647
2013/0264799 A1* 10/2013 Taylor et al. .................. 280/647

* cited by examiner

INFANT STROLLER APPARATUS AND APPARATUS FOR SEATING A CHILD

CROSS-REFERENCE TO RELATED APPLICATION

This application claims priority to U.S. Provisional Patent Application No. 61/686,450, which was filed on Apr. 5, 2012, which is incorporated herein by reference.

BACKGROUND

1. Field of the Invention

The present inventions relate to apparatuses for seating a child, and more particularly to infant stroller apparatuses.

2. Description of the Related Art

Parents and caregivers can usually transport a child or children with a stroller apparatus. Because the stroller apparatus may be used on a frequent basis, an important factor is the ability to collapse the stroller to a compact size. Most stroller apparatuses have "one hand fold" mechanisms that allow the user to fold the stroller using only one hand. However, these mechanisms are typically mounted to strollers with a frame handle of a fixed size that makes the collapsed size larger, or a pivoting frame handle that requires a second step to move the handle to a shorter length after the stroller is fully collapsed.

Therefore, there is a need for an infant stroller apparatus that can address at least the foregoing issues, and can collapse to a compact size in a convenient manner.

SUMMARY

The present application describes an infant stroller apparatus that can be collapsed to a compact configuration in a convenient manner. In one embodiment, the infant stroller apparatus can include a rear leg frame including a first side segment, a handle having a second side segment formed by at least a first and a second tubular member telescopically assembled with each other, an impeding part assembled with the second side segment and operable to create an interference that blocks retraction of the second tubular member into the first tubular member, and an armrest pivotally connected with the second side segment and provided with an actuating member disposed adjacent to the impeding part. A rotation of the armrest in a direction for collapsing the infant stroller apparatus can cause a displacement of the actuating member, which drives the impeding part in movement to remove the interference and allow retraction of the second tubular member into the first tubular member.

In other embodiments, an apparatus for seating a child is described. The apparatus includes a first frame portion including a first side segment, a second frame portion having a second side segment formed by at least a first and a second tubular member telescopically assembled with each other, an impeding part pivotally assembled with the second side segment about a first pivot axis and operable to create an interference that blocks retraction of the second tubular member into the first tubular member, and a third frame portion pivotally connected with the second side segment about a second pivot axis and affixed with an actuating member disposed adjacent to the impeding part. A rotation of the third frame portion in a direction for collapsing the infant stroller apparatus causes a rotation of the actuating member, which drives the impeding part to rotate about the first pivot axis to remove the interference and allow retraction of the second tubular member into the first tubular member.

At least one advantage of the structures described herein includes the ability to provide a telescopic handle that can automatically retract to a reduced length when the stroller apparatus is collapsed. Accordingly, the stroller apparatus can conveniently collapse to a compact size by using one hand.

DETAILED DESCRIPTION OF THE EMBODIMENTS

Figure 1:
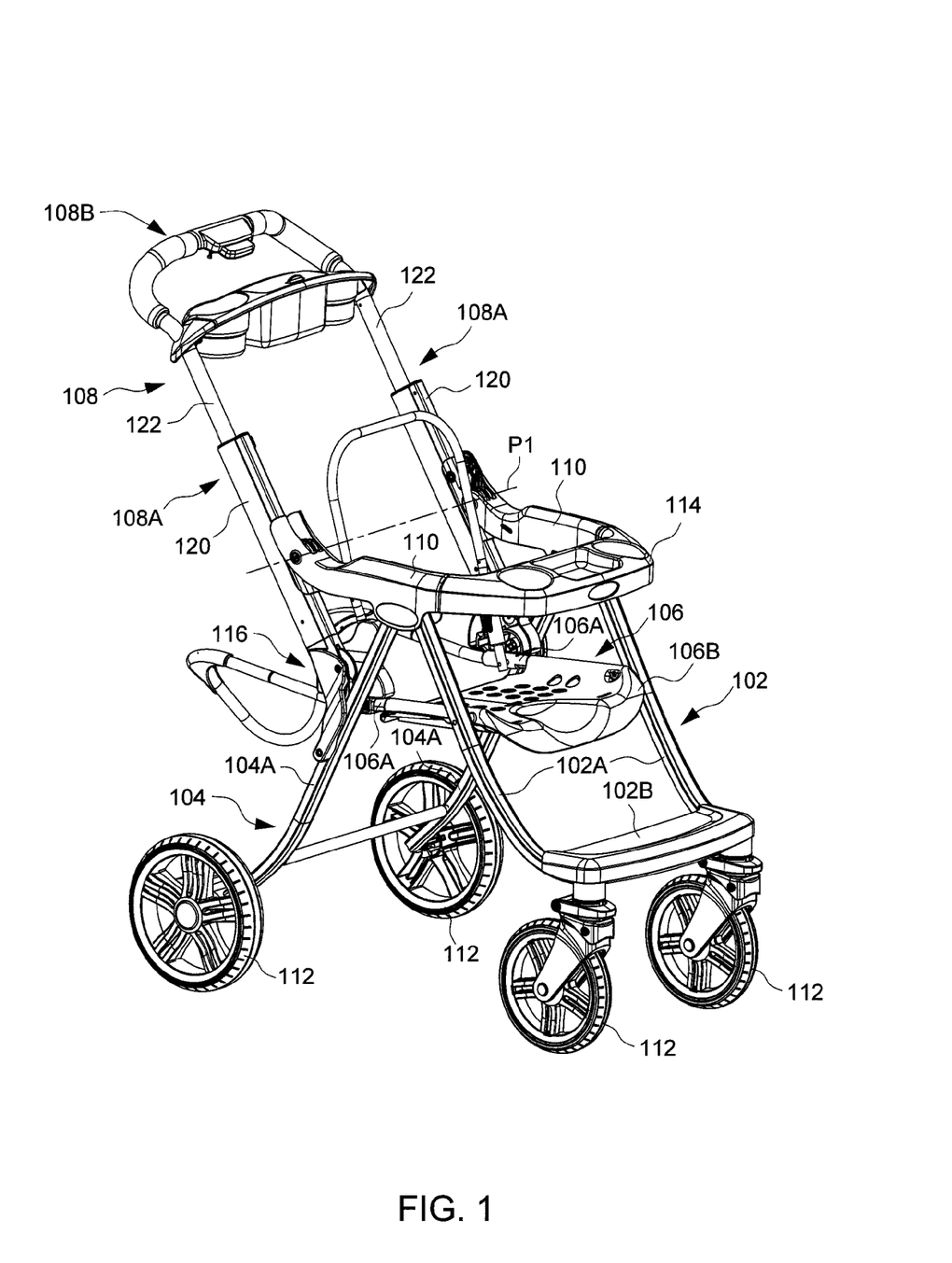
FIG. 1 is a perspective view illustrating an embodiment of an infant stroller apparatus.

FIG. 1 is a schematic view illustrating an embodiment of an infant stroller apparatus 100. The infant stroller apparatus 100 can include the assembly of multiple frame portions that are operable to fold to a collapsed state for convenient storage and transportation, and unfold to a deployed state for use. The frame portions can include a front leg frame 102, a rear leg frame 104, a seat frame 106, a handle 108, and left and right armrests 110. The front leg frame 102 can be formed by the assembly of tubular segments, including left and right side segments 102A, and a transversal segment 102B connected with lower portions of the two side segments 102A. The rear leg frame 104 can also include left and right side segments 104A. Lower ends of the front and rear leg frames 102 and 104 can be respectively connected with a plurality of wheels 112.

The seat frame 106 can include a left and a right side bar 106A that extend from a rear toward a front of the child stroller apparatus 100. At each of the left and right sides, the side bar 106A can be pivotally connected with the side segment 102A of the front leg frame 102 and the side segment 104A of the rear leg frame 104 at two spaced-apart pivot points, respectively. The seat frame 106 can provide support for a seat board 106B on which a child can be installed.

The two armrests 110 can be disposed vertically above the seat frame 106, and can extend lengthwise from the rear toward the front. At each of the left and right sides, the armrest 110 can have a rear end portion pivotally connected with the handle 108, and a front end portion affixed with a transverse segment 114 which can serve as a front table or guard member. Moreover, a middle region of each armrest 110 can be pivotally connected with the upper ends of the side segments 102A and 104A of the front and rear leg frames 102 and 104, respectively.

The handle 108 can have a U-shape including left and right side segments 108A, and a transversal segment 108B connected with the two side segments 108A. At each of the left and right sides, the side segment 108A of the handle 108 can be pivotally connected with the rear end portion of the armrest 110 about a pivot axis P1. Moreover, lower end portions of the two side segments 108A of the handle 108 can be respectively connected with the two side segments 104A of the rear leg frame 104 via two hinge structures 116. Each of the two hinge structures 116 can include an internal latch (not shown) operable to lock the handle 108 in the deployed state, and to unlock the handle 108 for allowing folding of the infant stroller apparatus 100.

Referring again to FIG. 1, each of the two side segments 108A of the handle 108 can be formed from the telescopic assembly of at least a first tubular member 120 and a second tubular member 122. The second tubular member 122 can retract at least partially into the first tubular member 120 to reduce the length of the handle 108, and can extend outward from the first tubular member 120 to increase the length of the handle 108. The first tubular member 120 may have a lower end connected with the hinge structure 116, and can be pivotally connected with the rear end portion of the armrest 110 about the pivot axis P1. The second tubular member 122 can be movably assembled through the first tubular member 120, and can have an upper end portion connected with the transversal segment 108B of the handle 108.

A locking mechanism 124 (better shown in FIG. 2) may be provided at each of the left and right sides of the infant stroller apparatus 100 adjacent to the pivot axis P1. The locking mechanism 124 can be operable to block retraction of the second tubular member 122 into the first tubular member 120 when the infant stroller apparatus 100 is in the deployed state, and to self unlock when the infant stroller apparatus 100 is folded toward the collapsed state to allow retraction of the second tubular member 122 into the first tubular member 120.

Figure 2:
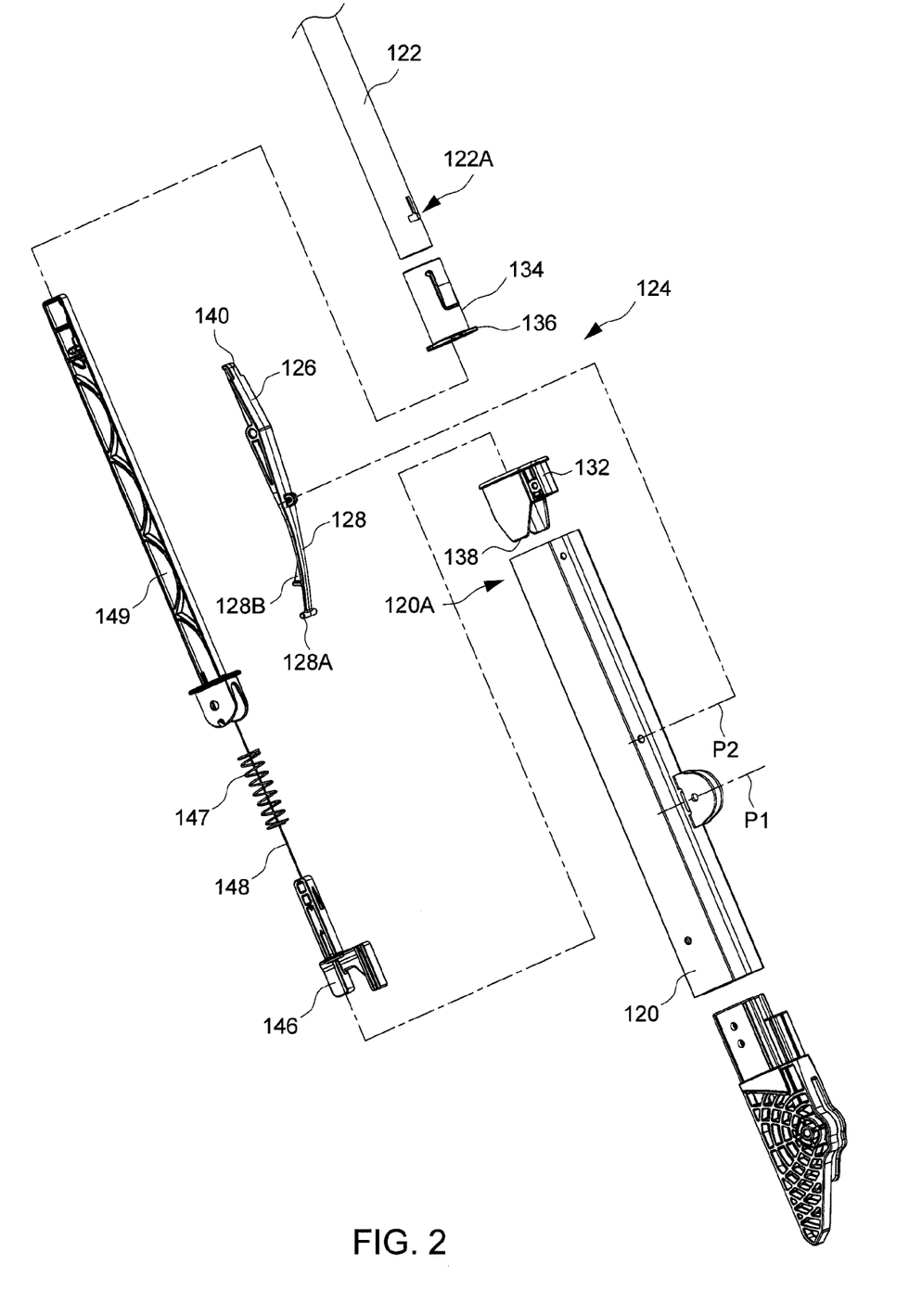
FIG. 2 is an exploded view illustrating a locking mechanism used in a telescopic handle of the infant stroller apparatus.
Figure 3:
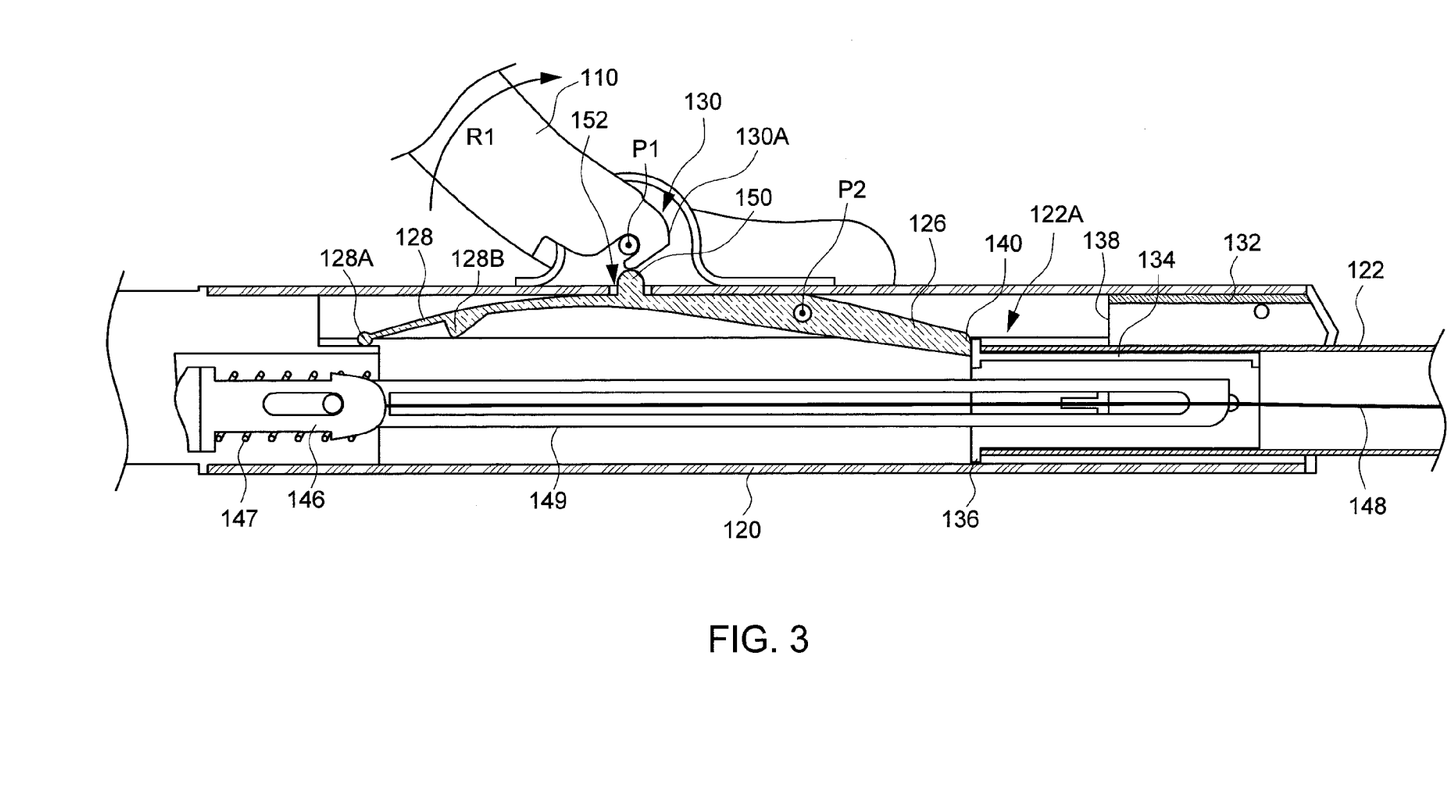
FIG. 3 is a cross-sectional view illustrating the assembly of the locking mechanism.
Figure 4:
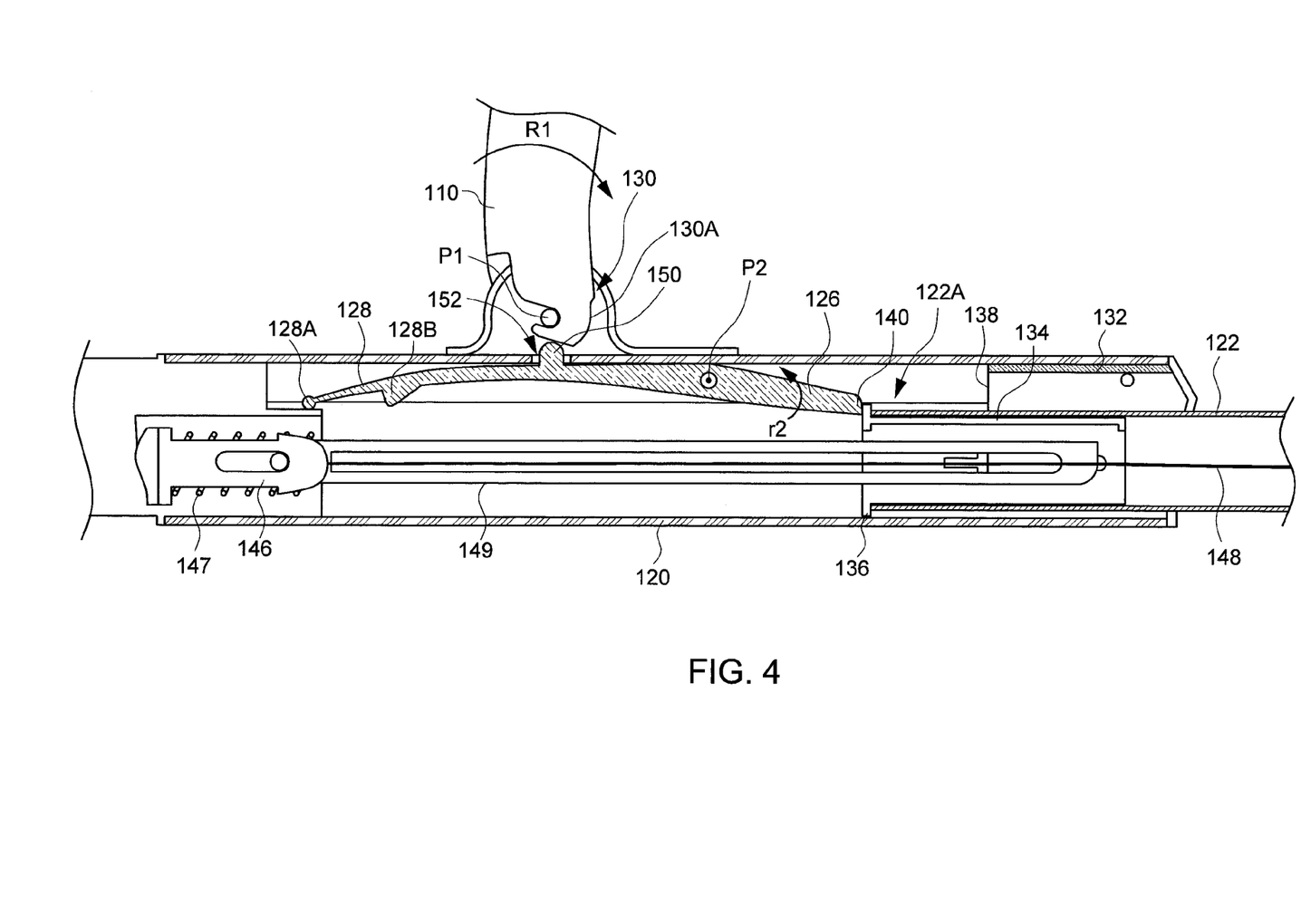
FIGS. 4-6 are schematic views illustrating the locking mechanism in various intermediate states as the infant stroller apparatus is folded from a deployed state toward a collapsed state.

FIG. 2 is an exploded view illustrating the locking mechanism 124, and FIG. 3 is a schematic cross-sectional view illustrating the assembly of the locking mechanism 124. Referring to FIGS. 2 and 3, the locking mechanism 124 can include an impeding part 126, a spring structure 128 and an actuating member 130. An upper end portion 120A of the first tubular member 120 can be affixed with an end cap 132. A lower end portion 122A of the second tubular member 122 can be provided with a fixed collar 134 having a flange 136 protruding radial. The lower end portion 122A of the second tubular member 122 and the collar 134 can be guided for movement along the interior of the first tubular member 120. The flange 136 of the collar 134 can abut against an edge 138 of the end cap 132 to prevent the lower end portion 122A of the second tubular member 122 from sliding outside the first tubular member 120.

The impeding part 126 can be formed with an elongated shape that is assembled with one side segment 108A of the handle 108. More specifically, the impeding part 126 can assembled inside the first tubular member 120, and can be pivotally connected with the first tubular member 120 about a pivot axis P2 spaced apart from the pivot axis P1. In one embodiment, the pivot axis P2 may extend parallel to the pivot axis P1 An end 140 of the impeding part 126 may abut against the lower end portion 122A of the second tubular member 122 (e.g., the flange 136 of the collar 134), which can create an interference that blocks retraction of the second tubular member 122 into the first tubular member 120.

The spring structure 128 can be connected with the impeding part 126 at a side opposite to that of the lower end portion 122A of the second tubular member 122. In one embodiment, the spring structure 128 can have an elastic elongated shape that is formed integrally with the impeding part 126. A distal end 128A of the spring structure 128 can be connected with an inner surface of the first tubular member 120 at a location longitudinally apart from the pivot axis P2. Moreover, a side of the spring structure 128 facing the center axis of the first tubular member 120 can include a protrusion 128B. The spring structure 128 can be operable to bias the impeding part 126 to an impeding position where the impeding part 126 can abut against the lower end portion 122A to block retraction of the second tubular member 122 into the first tubular member 120.

The actuating member 130 can be affixed with the armrest 110, so that the actuating member 130 and the armrest 110 can rotate in unison about the pivot axis P1. In one embodiment, the actuating member 130 can be formed as a cam-shaped rib 130A arranged adjacent to the pivot axis P1. The actuating member 130 can be formed integrally with the armrest 110, or can be a component part securely attached with the armrest 110 via any suitable fastener device.

Referring again to FIGS. 2 and 3, other shown components can include a latch 146 that is assembled through the interior of the first tubular member 120, a spring 147 operable to bias the latch 146 toward a lower position relative to the first tubular member 120 to lock the hinge structure 116, a cable 148 connected with the latch 146 and operable to pull the latch 146 toward an upper position to unlock the hinge structure 116, and an elongated sleeve 149 affixed with the first tubular member 120 and enclosing a portion of the cable 148.

Figure 5:
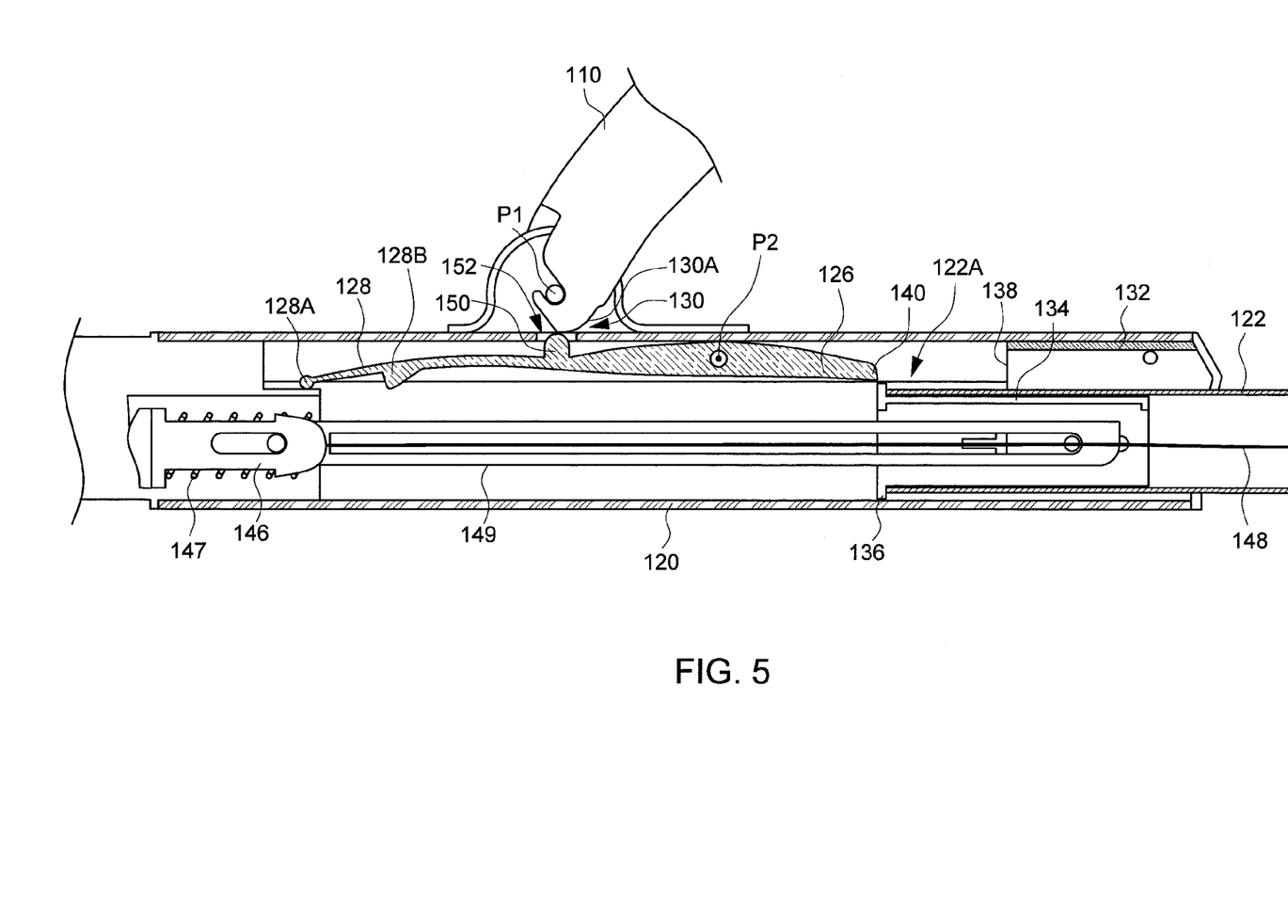

In conjunction with FIG. 3, FIGS. 4-6 are schematic views illustrating the locking mechanism 124 in various intermediate states as the handle 108 and the armrest 110 are turned from the deployed state to the collapsed state. In FIG. 3, the locking mechanism 124 is shown in an impeding state that blocks retraction of the handle 108, while the infant stroller apparatus 100 is held in the deployed state. When the infant stroller apparatus 100 is folded from the deployed state toward the collapsed state, the armrest 110 can rotate about the pivot axis P1 in a direction R1 toward the second tubular member 122. The actuating member 130 can also rotate with the armrest 110 about the pivot axis P1 in the direction R1, until the actuating member 130 pushes against a region of the impeding part 126 that is spaced apart from the pivot axis P2 and is opposite to the side of the end 140. As a result, the impeding part 126 can rotate about the pivot axis P2 in a direction r2 opposite to R1 to disengage the end 140 of the impeding part 126 from the lower end portion 122A of the second tubular member 122. The interference of the impeding part 126 that blocks inward displacement of the second tubular member 122 can be thereby removed as shown in FIG. 5, and the second tubular member 122 is allowed to retract into the first tubular member 120. In one embodiment, the disengagement of the impeding part 126 from the impeding position can take place at about 80% of the folding course of the infant stroller apparatus 100.

It is worth noting that the placement of the pivot axes P1 and P2 is not limited to the above embodiment. In other examples of implementation, the pivot axes P1 and P2 may also be aligned with each other, and the impeding part 126 can be driven in rotation by the armrest 110 to project outward for removing the interference between the end 140 of the impeding part 126 and the lower end portion 122A of the second tubular member 122.

The rotation of the impeding part 126 to disengage the end 140 of the impeding part 126 from the lower end portion 122A of the second tubular member 122 can also cause elastic deflection of the spring structure 128, which displaces the protrusion 128B toward the center axis of the first tubular member 120. When the handle 108 is collapsed, the protrusion 128B can thereby abut against the flange 136 (the protrusion 128B and the end 140 of the impeding part 126 can abut against two opposite sides of the flange 136) for retaining the second tubular member 122 in the retracted state.

For facilitating the interaction between the impeding part 126 and the actuating member 130, the impeding part 126 can include a protrusion 150 that projects outward through an opening 152 of the first tubular member 120. The protrusion 150 may be disposed between the pivot axis P2 and the distal end of the spring structure 128. The cam-shaped rib 130A of the actuating member 130 can rotate along with the armrest 110 about the pivot axis P1 to push the protrusion 150 inward, which causes rotation of the impeding part 126 about the pivot axis P2 for removing the interference that blocks retraction of the second tubular member 122 into the first tubular member 120.

Figure 6:
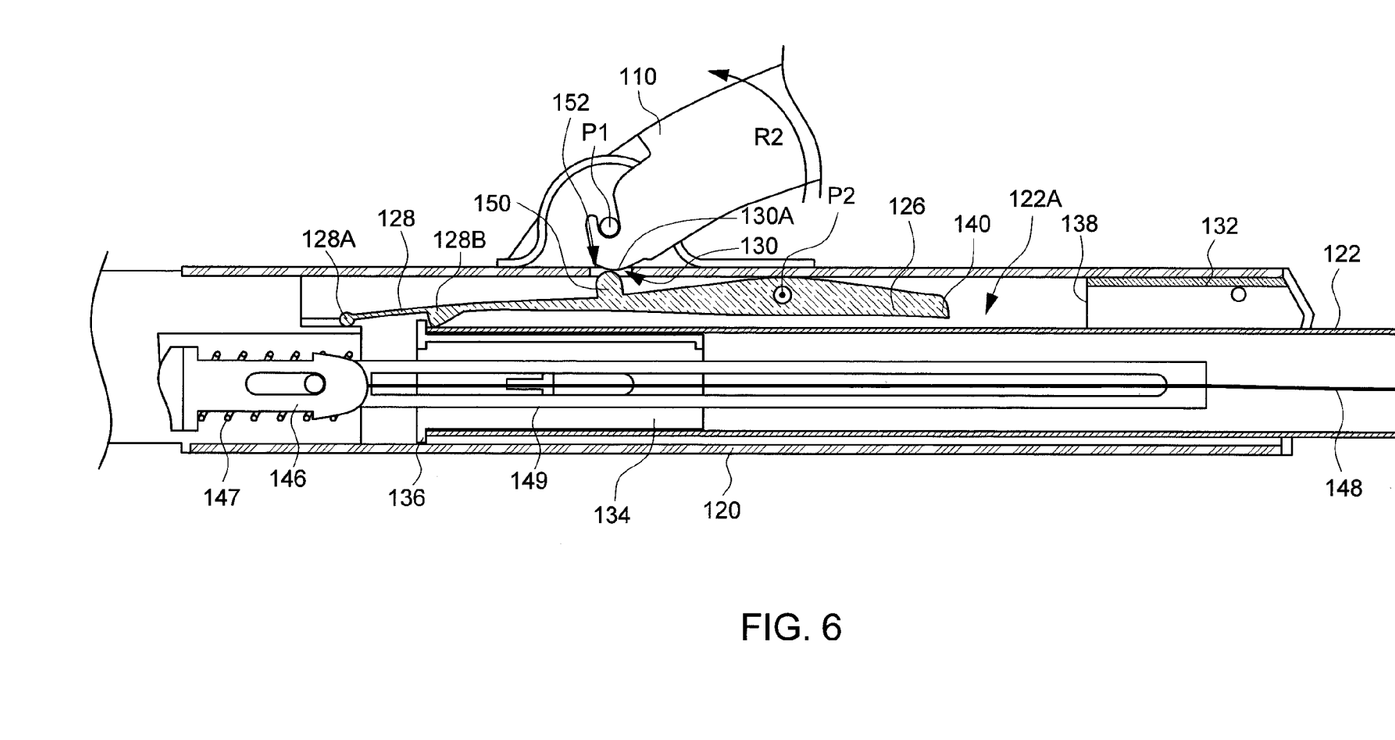

Once the interference of the impeding part 126 is removed, the second tubular member 122 can be retracted into the first tubular member 120 until the lower end portion 122A of the second tubular member 122 travels past the protrusion 128B of the spring structure 128, as shown in FIG. 6. In this manner, the protrusion 128B of the spring structure 128 can abut against the flange 136 at the lower end portion 122A of the second tubular member 122 to block its movement in a reverse direction for extension. The spring structure 128 can thereby retain the second tubular member 122 in the retracted state.

When the infant stroller apparatus 100 is unfolded from the collapsed state toward the deployed state, the armrest 110 can rotate about the pivot axis P1 in a direction R2 (as better shown in FIG. 6) opposite to the direction R1 toward the first tubular member 120. The actuating member 130 can also rotate along with the armrest 110 about the pivot axis P1 in the direction R2 to remove the inward pressure applied on the protrusion 150. As a result, the spring structure 128 can elastically bias the impeding part 126 to rotate about the pivot axis P2 to restore the impeding position shown in FIG. 4, and displace the protrusion 128B to a disengaged position for allowing extension of the second tubular member 122. Subsequently, the second tubular member 122 can be extended outward, until the lower end portion 122A thereof travels past the end 140 of the impeding part 126. Once the second tubular member 122 reaches its full extension, the end 140 of the impeding part 126 can abut against the lower end portion 122A of the second tubular member 122 to block its retraction.

At least one advantage of the structures described herein includes the ability to provide a telescopic handle that can automatically retract to a reduced length when the stroller apparatus is collapsed. Accordingly, a caregiver can easily collapse the stroller apparatus to a compact size with one hand.

A skilled person would readily appreciate that the aforementioned features and advantages may be applied in any apparatus that can be used to seat a child (e.g., high chairs, infant walkers, etc.) and includes at least a first, second and third frame portion assembled in a manner similar to the rear leg frame, and the handle and the armrest as described above.

Realizations of the stroller apparatuses and related structures have been described in the context of particular embodiments. These embodiments are meant to be illustrative and not limiting. Many variations, modifications, additions, and improvements are possible. These and other variations, modifications, additions, and improvements may fall within the scope of the inventions as defined in the claims that follow.

What is claimed is:

1. An infant stroller apparatus comprising:
a rear leg frame including a first side segment;
a handle having a second side segment formed by at least a first and a second tubular member telescopically assembled with each other;
an impeding part assembled with the second side segment and operable to create an interference that blocks retraction of the second tubular member into the first tubular member; and
an armrest pivotally connected with the second side segment and provided with an actuating member disposed adjacent to the impeding part, wherein a rotation of the armrest in a direction for collapsing the infant stroller apparatus causes a displacement of the actuating member, which drives the impeding part in movement to remove the interference and allow retraction of the second tubular member into the first tubular member.

2. The infant stroller apparatus according to claim 1, wherein the impeding part is pivotally assembled with the second side segment.

3. The infant stroller apparatus according to claim 1, wherein the impeding part is operable to abut against an end portion of the second tubular member to block retraction of the second tubular member into the first tubular member.

4. The infant stroller apparatus according to claim 3, wherein the impeding part is pivotally connected with the first tubular member about a pivot axis, and the actuating member pushes against a region of the impeding part spaced apart from the pivot axis to push the impeding part in rotation about the pivot axis for removing the interference that blocks retraction of the second tubular member into the first tubular member.

5. The infant stroller according to claim 3, wherein the impeding part is pivotally connected with the first tubular member about a pivot axis, and is connected with a spring structure operable to bias the impeding part to a position for abutting against the end portion of the second tubular member.

6. The infant stroller apparatus according to claim 5, wherein the spring structure is formed integrally with the impeding part.

7. The infant stroller apparatus according to claim 5, wherein the spring structure has an elongated shape that is connected with the impeding part and has a distal end connected with the first tubular member.

8. The infant stroller apparatus according to claim 5, wherein the actuating member rotates along with the armrest to push the impeding part in rotation for removing the interference that blocks retraction of the second tubular member into the first tubular member, and to cause elastic deflection of the spring structure.

9. The infant stroller apparatus according to claim 8, wherein the spring structure includes a protrusion, and the elastic deflection of the spring structure displaces the protrusion to a position adapted to interact with the end portion of the second tubular member to retain the second tubular member in a retracted state.

10. The infant stroller apparatus according to claim 1, wherein the armrest is pivotally connected with the first tubular member about a first pivot axis, the impeding part is pivotally assembled with the first tubular member about a second pivot axis spaced apart from the first pivot axis, and the actuating member rotates along with the armrest about the first pivot axis to push the impeding part in rotation about the second pivot axis for removing the interference that blocks retraction of the second tubular member into the first tubular member.

11. The infant stroller apparatus according to claim 10, wherein the actuating member has a cam-shaped rib.

12. The infant stroller apparatus according to claim 11, wherein the impeding part includes a protrusion that projects through an opening of the first tubular member, and the cam-shaped rib rotates along with the armrest about the first pivot axis to push against the protrusion to cause rotation of the impeding part for removing the interference that blocks retraction of the second tubular member into the first tubular member.

13. An apparatus for seating a child, comprising:
    a first frame portion including a first side segment;
    a second frame portion having a second side segment formed by at least a first and a second tubular member telescopically assembled with each other;
    an impeding part pivotally assembled with the second side segment about a first pivot axis and operable to create an interference that blocks retraction of the second tubular member into the first tubular member; and
    a third frame portion pivotally connected with the second side segment about a second pivot axis and affixed with an actuating member disposed adjacent to the impeding part, wherein a rotation of the third frame portion in a direction for collapsing the apparatus causes a rotation of the actuating member, which drives the impeding part to rotate about the first pivot axis to remove the interference and allow retraction of the second tubular member into the first tubular member.

14. The apparatus according to claim 13, wherein the impeding part is operable to abut against an end portion of the second tubular member to block retraction of the second tubular member into the first tubular member.

15. The apparatus according to claim 14, wherein the impeding part is pivotally connected with the first tubular member, and the actuating member pushes against a region of the impeding part spaced apart from the first pivot axis to push the impeding part in rotation about the first pivot axis for removing the interference that blocks retraction of the second tubular member into the first tubular member.

16. The apparatus according to claim 14, wherein the impeding part is pivotally connected with the first tubular member, and is connected with a spring structure operable to bias the impeding part to a position for abutting against the end portion of the second tubular member.

17. The apparatus according to claim 16, wherein the spring structure is formed integrally with the impeding part.

18. The apparatus according to claim 16, wherein the spring structure has an elongated shape that is connected with the impeding part and has a distal end connected with the first tubular member.

19. The apparatus according to claim 16, wherein the actuating member rotates along with the third frame portion to push the impeding part in rotation for removing the interference that blocks retraction of the second tubular member into the first tubular member, and to cause elastic deflection of the spring structure.

20. The apparatus according to claim 19, wherein the spring structure includes a protrusion, and the elastic deflection of the spring structure displaces the protrusion to a position adapted to interact with the end portion of the second tubular member to retain the second tubular member in a retracted state.

21. The apparatus according to claim 13, wherein the actuating member has a cam-shaped rib.

22. The apparatus according to claim 21, wherein the impeding part includes a protrusion that projects through an opening of the first tubular member, and the cam-shaped rib rotates along with the third frame portion about the second pivot axis to push against the protrusion, which causes rotation of the impeding part about the first pivot axis for removing the interference that blocks retraction of the second tubular member into the first tubular member.

* * * * *